US012735190B1

(12) United States Patent
Clark et al.

(10) Patent No.: US 12,735,190 B1
(45) Date of Patent: Sep. 15, 2026

(54) AIRCRAFT PROPULSION SYSTEM WITH HYBRID-ELECTRIC POWERPLANT

(71) Applicant: RTX Corporation, Farmington, CT (US)

(72) Inventors: Thomas E. Clark, Wells, ME (US); Murat Yazici, Glastonbury, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 19/095,833

(22) Filed: Mar. 31, 2025

(51) Int. Cl.
*B64D 27/33* (2024.01)
*B64D 31/18* (2024.01)

(52) U.S. Cl.
CPC ............ *B64D 27/33* (2024.01); *B64D 31/18* (2024.01)

(58) Field of Classification Search
CPC ........ B64D 27/33; B64D 27/02; B64D 27/24; B64D 31/18; B64D 35/022; B64D 35/024
See application file for complete search history.

(56) References Cited

U.S. PATENT DOCUMENTS 10,378,452 B1 8/2019 Barmichev
11,866,180 B2 1/2024 Long
12,163,468 B1 12/2024 Bousquet
2010/0083631 A1 4/2010 Foster
2010/0083668 A1 4/2010 Foster
2010/0083669 A1 4/2010 Foster
2018/0163558 A1* 6/2018 Vondrell ................ B64D 31/18
2019/0322379 A1* 10/2019 Mackin ................. F01D 17/162
2019/0322382 A1* 10/2019 Mackin ................ B64D 35/024
2019/0323426 A1* 10/2019 Mackin .................. B64D 31/18
2019/0323427 A1* 10/2019 Mackin ................... F04D 25/06
2021/0025339 A1 1/2021 Terwilliger
2021/0179282 A1 6/2021 Venter
2022/0063826 A1* 3/2022 Hiett ........................ F02C 7/262
2022/0297844 A1* 9/2022 Mackin .................. B64D 41/00
2023/0160358 A1 5/2023 Terwilliger
2024/0246684 A1 7/2024 Trawick
2024/0246690 A1 7/2024 Trawick

OTHER PUBLICATIONS

EP search report for EP26169867.4 dated Jul. 22, 2026.

* cited by examiner

*Primary Examiner* — Rodney A Bonnette
(74) *Attorney, Agent, or Firm* — Getz Balich LLC

(57) ABSTRACT

An aircraft system includes a powerplant configured to drive rotation of a propulsor rotor during a first mode and a second mode. The powerplant includes a turbine engine, a first electric machine and a power coupler. A first rotating structure includes a first turbine rotor disposed along a core flowpath. The first electric machine is configured as an electric motor during the second mode. The first electric machine is disposed between the propulsor rotor and the turbine engine. The first electric machine includes a first electric machine rotor coupled to the propulsor rotor. The power coupler is disposed between the first electric machine and the turbine engine. The power coupler is configured to couple the first rotating structure to the first electric machine rotor during the first mode. The power coupler is configured to decouple the first rotating structure from the first electric machine rotor during the second mode.

19 Claims, 7 Drawing Sheets

AIRCRAFT PROPULSION SYSTEM WITH HYBRID-ELECTRIC POWERPLANT

BACKGROUND OF THE DISCLOSURE

1. Technical Field

This disclosure relates generally to an aircraft and, more particularly, to a propulsion system for the aircraft.

2. Background Information

An aircraft propulsion system may include one or more electric machines. Various electric machine system arrangements for an aircraft propulsion system are known in the art. While these known electric machine systems have various benefits, there is still room in the art for improvement.

SUMMARY OF THE DISCLOSURE

According to an aspect of the present disclosure, a system is provided for an aircraft. This aircraft system includes a propulsor rotor and a powerplant configured to drive rotation of the propulsor rotor during a first mode and a second mode. The powerplant includes a turbine engine, a first electric machine and a power coupler. The turbine engine includes a compressor section, a combustor section, a turbine section, a core flowpath and a first rotating structure. The core flowpath extends through the compressor section, the combustor section and the turbine section. The first rotating structure includes a first turbine rotor disposed along the core flowpath within the turbine section. The first electric machine is configured as an electric motor during at least the second mode. The first electric machine is disposed between the propulsor rotor and the turbine engine. The first electric machine includes a first electric machine rotor coupled to the propulsor rotor. The power coupler is disposed between the first electric machine and the turbine engine. The power coupler is configured to couple the first rotating structure to the first electric machine rotor during the first mode. The power coupler is configured to decouple the first rotating structure from the first electric machine rotor during the second mode.

According to another aspect of the present disclosure, another system is provided for an aircraft. This aircraft system includes a propulsor rotor and a powerplant. The powerplant includes a turbine engine, a first electric machine and a power coupler. The powerplant is configured to drive rotation of the propulsor rotor using engine mechanical power generated by the turbine engine during a first mode where the engine mechanical power is transferred from the turbine engine, through the power coupler and the first electric machine, to the propulsor rotor. The powerplant is configured to drive the rotation of the propulsor rotor using electric machine mechanical power generated by the first electric machine during a second mode where the electric machine mechanical power is transferred from the first electric machine to the propulsor rotor. The power coupler is configured to operatively couple the turbine engine to the first electric machine during the first mode. The power coupler is configured to operatively decouple the turbine engine from the first electric machine during the second mode.

According to still another aspect of the present disclosure, another system is provided for an aircraft. This aircraft system includes a propulsor rotor and a powerplant. The powerplant includes a turbine engine, a first electric machine and a clutch. The powerplant is configured to drive rotation of the propulsor rotor using engine mechanical power generated by the turbine engine during a first mode. The powerplant is configured to drive the rotation of the propulsor rotor using electric machine mechanical power generated by the first electric machine during a second mode. The turbine engine includes a compressor section, a combustor section, a turbine section, a core flowpath and a first rotating structure. The core flowpath extends through the compressor section, the combustor section and the turbine section. The first rotating structure includes a first turbine rotor disposed along the core flowpath within the turbine section. The first electric machine includes a first electric machine rotor. The first electric machine rotor is mechanically coupled to the propulsor rotor. The clutch is configured to operatively couple the first rotating structure to the first electric machine rotor during the first mode. The clutch is configured to operatively decouple the first rotating structure from the first electric machine rotor during the second mode.

The powerplant may also be configured to drive the rotation of the propulsor rotor using the electric machine mechanical power generated by the first electric machine during the first mode where the electric machine mechanical power is transferred from the first electric machine to the propulsor rotor independent of the turbine engine and the power coupler.

During the first mode, the turbine engine may be configured to generate engine mechanical power. The powerplant may be configured to transfer the engine mechanical power from the first rotating structure, through the power coupler and the first electric machine rotor, to the propulsor rotor to drive the rotation of the propulsor rotor. During the second mode, the first electric machine may be configured to generate electric machine mechanical power. The powerplant may be configured to transfer the electric machine mechanical power from the first electric machine rotor to the propulsor rotor to drive the rotation of the propulsor rotor.

During the first mode, the first electric machine may also be configured to generate the electric machine mechanical power. The powerplant may be configured to transfer the electric machine mechanical power from the first electric machine rotor to the propulsor rotor to further drive the rotation of the propulsor rotor.

The first electric machine may also be configurable as an electric generator outside of the second mode.

The powerplant may also include a second electric machine electrically coupled to the first electric machine. The second electric machine may be configured as an electric generator during at least the second mode. The second electric machine may include a second electric machine rotor operatively coupled to the first rotating structure.

The second electric machine rotor may be coaxial with the first rotating structure.

A rotational axis of the second electric machine rotor may be offset from a rotational axis of the first rotating structure.

The turbine engine may also include a second rotating structure rotationally independent of the first rotating structure. The second rotating structure may include a second turbine rotor disposed along the core flowpath within the turbine section. The powerplant may also include a second electric machine electrically coupled to the first electric machine. The second electric machine may be configured as an electric generator during at least the second mode. The second electric machine may include a second electric machine rotor operatively coupled to the second rotating structure.

The second electric machine rotor may be coaxial with the second rotating structure.

A rotational axis of the second electric machine rotor may be offset from a rotational axis of the second rotating structure.

The second rotating structure may also include a compressor rotor disposed along the core flowpath within the compressor section.

The second turbine rotor may be configured as a power turbine rotor.

The system may also include a propulsion system and a power source. The propulsion system may include the propulsor rotor and the powerplant. The power source may be discrete from the propulsion system. The power source may be configured to supply electrical power to the first electric machine during the second mode.

The system may also include a second propulsion system comprising the power source.

The system may also include an auxiliary power unit comprising the power source.

The system may also include a power storage configured to supply electrical power to the first electric machine during the second mode.

The power coupler may be configured as or otherwise include a clutch.

The system may also include a geartrain operatively coupled between the power coupler and the first electric machine rotor.

The system may also include a geartrain operatively coupled between the first electric machine rotor and the propulsor rotor.

The propulsor rotor may be configured as or otherwise include a ducted propulsor rotor.

The propulsor rotor may be configured as or otherwise include an open propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
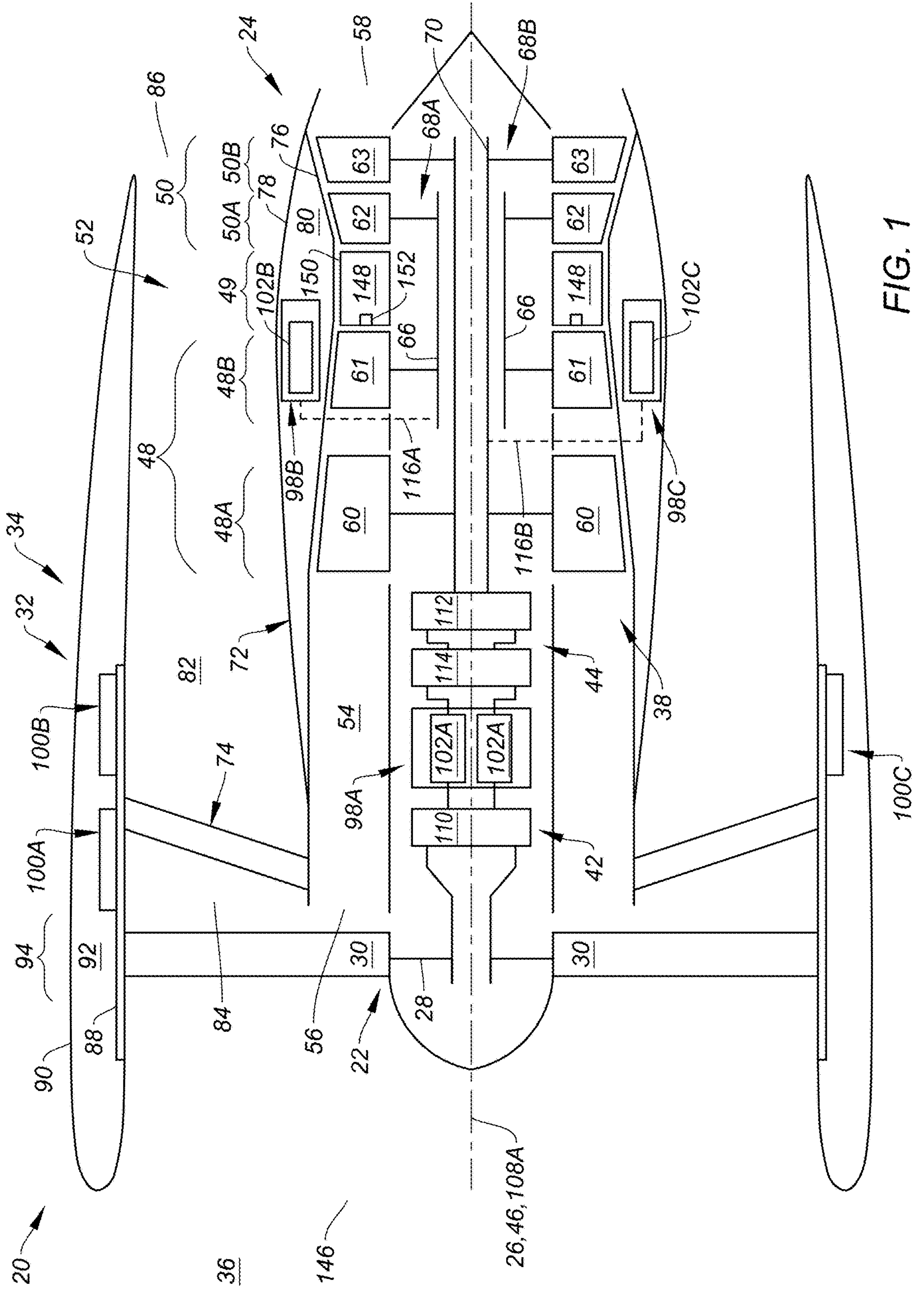
FIG. 1 is a side schematic illustration of an aircraft propulsion system.

FIG. 1 illustrates a propulsion system 20 for an aircraft. The aircraft may be an airplane, a drone (e.g., an unmanned aerial vehicle (UAV)) or any other manned or unmanned aerial vehicle or system. For ease of description, the aircraft propulsion system 20 may be generally described below as a turbofan propulsion system. The present disclosure, however, is not limited to such an exemplary propulsion system configuration. The aircraft propulsion system 20, for example, may alternatively be configured as a turbojet propulsion system, a turboprop propulsion system, a turboshaft propulsion system, a propfan propulsion system, a pusher fan propulsion system, or any other type of ducted and/or open propulsor rotor propulsion system. The aircraft propulsion system 20 of FIG. 1 includes a bladed propulsor rotor 22 and a propulsion system powerplant 24.

The propulsor rotor 22 is rotatable about a propulsor axis 26. This propulsor rotor 22 includes a rotor base 28 (e.g., a disk or a hub) and a plurality of propulsor blades 30 (e.g., airfoils). The propulsor blades 30 are arranged and may be equispaced circumferentially about the rotor base 28 and the propulsor axis 26 in an array; e.g., a circular array. Each of the propulsor blades 30 is connected to (e.g., formed integral with or otherwise attached to) the rotor base 28. Each of the propulsor blades 30 projects spanwise (e.g., radially relative to the propulsor axis 26) out from an outer periphery of the rotor base 28 to an outer distal tip of the respective propulsor blade 30. For ease of description, the propulsor rotor 22 may be generally described below as a ducted propulsor rotor such as a fan rotor. The propulsor rotor 22 of FIG. 1, for example, is housed within a fan duct formed by an outer housing structure 32 of a stationary propulsion system housing 34 for the aircraft propulsion system 20. With this arrangement, the propulsor rotor 22 is disposed within an interior of the aircraft propulsion system 20, outside of a surrounding environment 36 external to the aircraft propulsion system 20 and, more generally, external to the aircraft. The present disclosure, however, is not limited to such an exemplary propulsor rotor configuration. The propulsor rotor 22, for example, may alternatively be configured as an open propulsor rotor. More particularly, the outer housing structure 32 may be omitted from the propulsion system housing 34 to expose the propulsor rotor 22 to the external environment 36.

The propulsion system powerplant 24 of FIG. 1 is a hybrid-electric powerplant; e.g., a convertible parallel-series hybrid electric powerplant. This propulsion system powerplant 24 is configured to drive rotation of the propulsor rotor 22 about its propulsor axis 26 during various modes of operation. These operating modes may include, but are not limited to, a first mode (e.g., a hybrid-electric parallel mode) and a second mode (e.g., a hybrid-electric series mode) as described below in further detail. The propulsion system powerplant 24 of FIG. 1 includes a gas turbine engine 38, an electric machine system 40 (see FIG. 2), an electric machine-propulsor (EMP) drivetrain 42 and an engine-electric machine (EEM) drivetrain 44.

The turbine engine 38 extends axially along an engine axis 46, which engine axis 46 may or may not be coaxial with the propulsor axis 26. The turbine engine 38 includes a compressor section 48, a combustor section 49 and a turbine section 50. The compressor section 48 of FIG. 1 includes a low pressure compressor (LPC) section 48A and a high pressure compressor (HPC) section 48B. The turbine section 50 of FIG. 1 includes a high pressure turbine (HPT) section 50A and a low pressure turbine (LPT) section 50B. At least (or only) the LPC section 48A, the HPC section 48B, the combustor section 49, the HPT section 50A and the LPT section 50B collectively form a core 52 (e.g., a gas generator) of the turbine engine 38 of FIG. 1. The turbine engine 38 also includes a core flowpath 54; e.g., an annular core flowpath. This core flowpath 54 extends sequentially longitudinally through the LPC section 48A, the HPC section 48B, the combustor section 49, the HPT section 50A and the LPT section 50B from an airflow inlet 56 into the core flowpath 54 to a combustion products exhaust 58 out from the core flowpath 54.

The LPC section 48A, the HPC section 48B, the combustor section 49, the HPT section 50A and the LPT section 50B may be arranged sequentially along the engine axis 46 within the propulsion system housing 34. The LPC section 48A includes a bladed low pressure compressor (LPC) rotor 60. The HPC section 48B includes a bladed high pressure compressor (HPC) rotor 61. The HPT section 50A includes a bladed high pressure turbine (HPT) rotor 62. The LPT section 50B includes a bladed low pressure turbine (LPT) rotor 63. Each of these engine rotors 60-63 includes a rotor base (e.g., a disk or a hub) and a plurality of rotor blades (e.g., airfoils, vanes, etc.). The rotor blades may be arranged into one or more stages axially along the respective engine rotor 60-63 and/or longitudinally along the core flowpath 54. The rotor blades in each stage are arranged and may be equispaced circumferentially around the respective rotor base in an annular array. Each of the rotor blades is connected to the respective rotor base. The rotor blades, for example, may be formed integral with or otherwise attached to the respective rotor base. Each of the rotor blades projects spanwise (e.g., radially) out from the respective rotor base, substantially across the core flowpath 54, to an outer distal tip of the respective rotor blade. Note, although not shown for ease of illustration, each rotor blade stage may be disposed next to and upstream or downstream of a respective neighboring stage of stator vanes for that respective engine section 48A, 48B, 50A, 50B along the core flowpath 54. At least some of the rotor blade stages may also be disposed between a neighboring pair of upstream and downstream stages of stator vanes along the core flowpath 54.

The HPC rotor 61 is coupled to and rotatable with the HPT rotor 62. The HPC rotor 61 of FIG. 1, for example, is connected to the HPT rotor 62 through a high speed shaft 66. At least (or only) the HPC rotor 61, the HPT rotor 62 and the high speed shaft 66 collectively form a high speed rotating structure 68A; e.g., a high speed spool of the turbine engine 38 and its engine core 52. This high speed rotating structure 68A of FIG. 1 and its members 61, 62 and 66 are rotatable about the engine axis 46. However, it is contemplated the high speed rotating structure 68A may alternatively be rotatable about another axis laterally and/or angularly offset from the propulsor axis 26 and/or the centerline axis of the turbine engine 38.

The LPC rotor 60 is coupled to and rotatable with the LPT rotor 63. The LPC rotor 60 of FIG. 1, for example, is connected to the LPT rotor 63 through a low speed shaft 70. At least (or only) the LPC rotor 60, the LPT rotor 63 and the low speed shaft 70 collectively form a low speed rotating structure 68B; e.g., a low speed spool of the turbine engine 38 and its engine core 52. This low speed rotating structure 68B of FIG. 1 and its members 60, 63 and 70 are rotatable about the engine axis 46. However, it is contemplated the low speed rotating structure 68B may alternatively be rotatable about another axis laterally and/or angularly offset from the propulsor axis 26 and/or the centerline axis of the turbine engine 38.

The propulsion system housing 34 of FIG. 1 includes an inner housing structure 72 and the outer housing structure 32. The propulsion system housing 34 may also include a guide vane structure 74 (e.g., a fan exit guide vane (FEGV) structure) extending radially between and connected to the inner housing structure 72 and the outer housing structure 32.

The inner housing structure 72 of FIG. 1 includes an inner case 76 (e.g., a core case) for the turbine engine 38, an inner nacelle structure 78 (sometimes referred to as an inner fixed structure (IFS)) and an internal inner housing compartment 80 (e.g., an engine compartment). The inner case 76 is disposed radially outboard of, extends axially along and may circumscribe one or more or all of the engine sections 48A-50B and the engine rotors 60-63. The inner case 76 may thereby house and provide a support structure for the respective engine sections 48A-50B and the engine rotors 60-63. The inner nacelle structure 78 is configured to provide an aerodynamic cover over the engine core 52 and its inner case 76. The inner housing compartment 80 of FIG. 1 is formed by and is disposed radially between the inner case 76 and an inner barrel of the inner nacelle structure 78. The inner housing structure 72 and its inner nacelle structure 78 may also form a radial inner peripheral boundary of a bypass flowpath 82; e.g., an annular bypass flowpath. This bypass flowpath 82 extends through a bypass duct from an airflow inlet 84 into the bypass flowpath 82 to an airflow exhaust 86 from the bypass flowpath 82, where the bypass duct may be formed by the inner housing structure 72 and the outer housing structure 32. The bypass flowpath 82 and its bypass duct are configured to bypass (e.g., are disposed radially outboard of and extend along) the engine core 52 and the inner housing structure 72.

The outer housing structure 32 of FIG. 1 includes an outer case 88 (e.g., a fan case), an outer nacelle structure 90 and an internal outer housing compartment 92. The outer case 88 is disposed radially outboard of, extends axially along and may circumscribe a propulsor section 94 of the aircraft propulsion system 20 and its propulsor rotor 22. The outer case 88 may thereby house and may be configured as a containment structure for the propulsor section 94 and its propulsor rotor 22. The outer nacelle structure 90 is configured to provide an aerodynamic cover over the outer case 88. The outer housing compartment 92 of FIG. 1 is at least partially formed by and disposed radially between the outer case 88 and an outer portion (e.g., fan cowls) of the outer nacelle structure 90. The outer housing structure 32 and its outer nacelle structure 90 may also form a radial outer peripheral boundary of the bypass flowpath 82.

Figure 2:
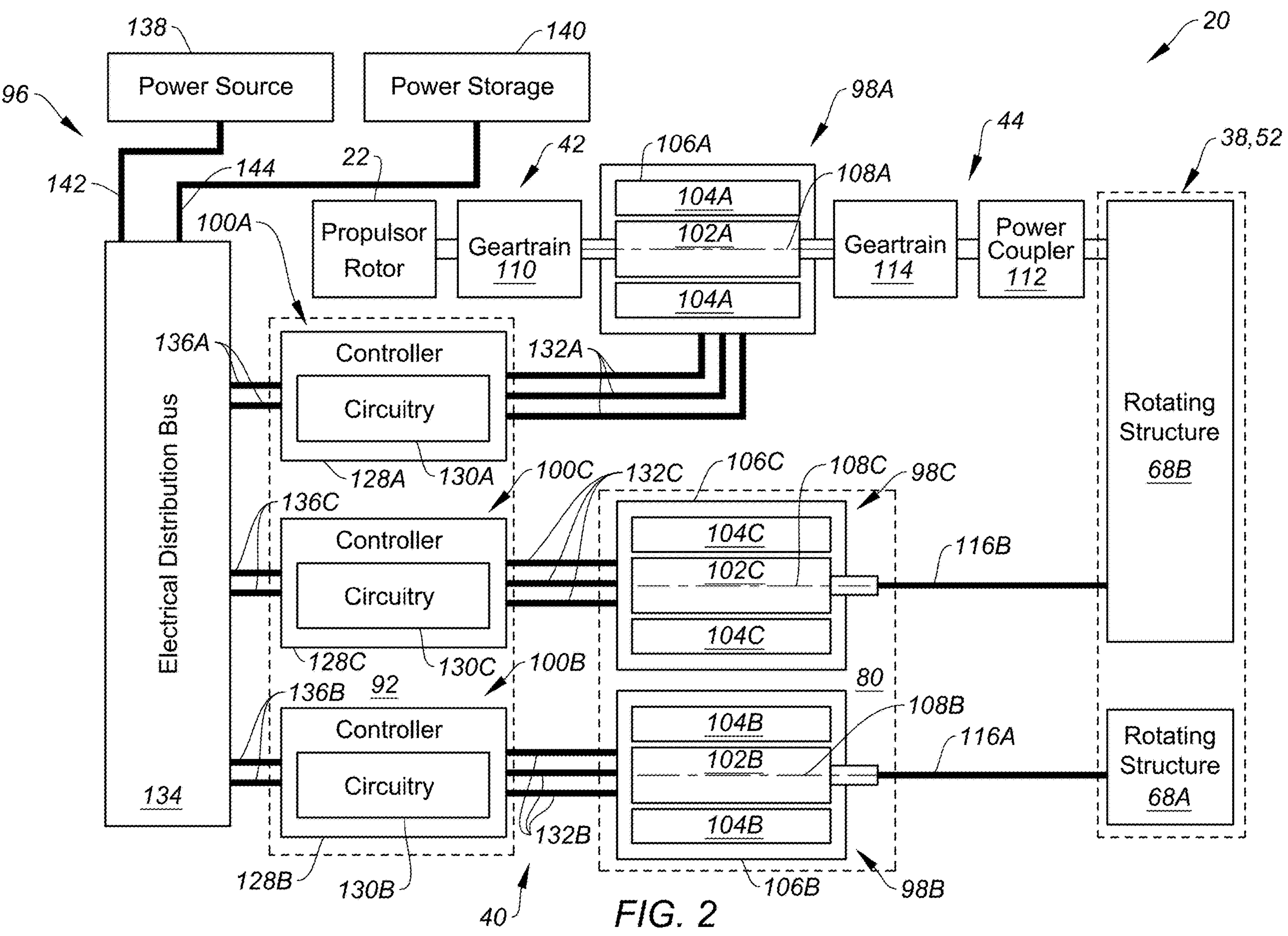
FIG. 2 is a schematic illustration of an electric machine system for the aircraft propulsion system electrically coupled to an electrical system.

Referring to FIG. 2, the electric machine system 40 is electrically coupled to an electrical system 96 for the aircraft and its aircraft propulsion system 20. The electric machine system 40 of FIG. 2 includes one or more electric machines 98A-C (generally referred to as "98") and one or more electric machine (EM) controllers 100A-C (generally referred to as "100"). For ease of description, each electric machine 98 of FIG. 2 is described below as being electrically coupled to, controlled by and/or otherwise associated with a single, dedicated one of the EM controllers 100. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines.

Each electric machine 98A-C of FIG. 2 includes an electric machine rotor 102A-C (generally referred to as "102"), an electric machine stator 104A-C (generally referred to as "104") and an electric machine case 106A-C (generally referred to as "106"). The machine rotor 102A-C is rotatable about a machine axis 108A-C (generally referred to as "108") of the respective machine rotor 102A-C, which machine axis 108 may be an axial centerline of the respective electric machine 98 and/or one or more of its members 102, 104 and/or 106. The machine stator 104 is disposed next to and in electromagnetic communication with the machine rotor 102. The machine stator 104 of FIG. 2, in particular, is radially outboard of and circumscribes the machine rotor 102. With this arrangement, each electric machine 98 is configured as a radial flux electric machine. The electric machines 98 of the present disclosure, however, are not limited to such an exemplary rotor-stator configuration nor to radial flux arrangements. The machine rotor 102, for example, may alternatively be radially outboard of and circumscribe the machine stator 104. In another example, the machine rotor 102 may be axially next to the machine stator 104 configuring the respective electric machine 98 as an axial flux electric machine. Referring again to FIG. 2, the machine rotor 102 and the machine stator 104 are at least partially or completely housed within an interior of the machine case 106.

Figure 3:
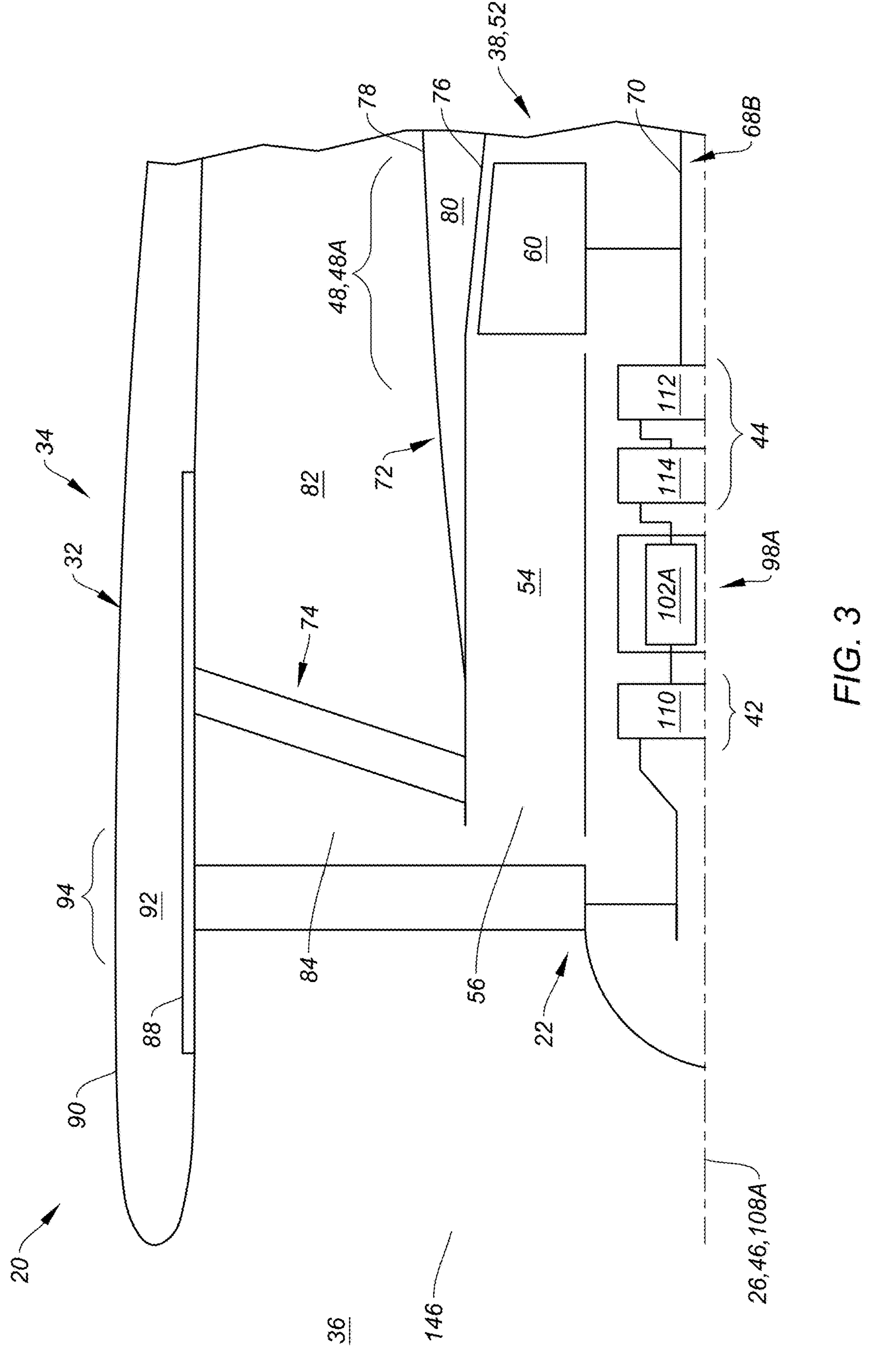
FIG. 3 is a partial side schematic illustration of the aircraft propulsion system at a propulsor electric machine.

Referring to FIG. 3, the propulsor electric machine 98A is operatively coupled to and arranged between the propulsor rotor 22 and the turbine engine 38. More particularly, the propulsor electric machine 98A of FIG. 3 is operatively coupled to and arranged (e.g., axially and/or mechanically) between the propulsor rotor 22 and the low speed rotating structure 68B. The propulsor electric machine (EM) rotor 102A of FIG. 3, for example, is mechanically coupled to the propulsor rotor 22 through the EMP drivetrain 42. The propulsor EM rotor 102A of FIG. 3 is mechanically coupled to the low speed rotating structure 68B through the EEM drivetrain 44. Here, the propulsor EM rotor 102A of FIG. 3 is coaxial with the propulsor rotor 22 and/or the low speed rotating structure 68B. However, it is contemplated the propulsor electric machine (EM) axis 108A may alternatively be laterally and/or angularly offset from the propulsor axis 26 and/or the engine axis 46 in other embodiments.

The EMP drivetrain 42 is configured to operatively couple the propulsor electric machine 98A to the propulsor rotor 22. The EMP drivetrain 42 of FIG. 3, for example, may be configured as or otherwise include an electric machine-propulsor (EMP) geartrain 110. Examples of the EMP geartrain 110 include, but are not limited to, a transmission, a speed change device and/or an epicyclic geartrain with a planetary gear system or a star gear system. The EMP geartrain 110 is operatively coupled to and arranged (e.g., axially and/or mechanically) between the propulsor EM rotor 102A and the propulsor rotor 22. With this arrangement, the propulsor rotor 22 may rotate at a different (e.g., slower) rotational speed than the propulsor EM rotor 102A. Here, the propulsor rotor 22 and the propulsor EM rotor 102A may rotate in a common (the same) direction about their axes 26 and 108A or in opposite directions about their axes 26 and 108A depending, for example, upon the specific configuration of the EMP geartrain 110. However, it is contemplated the EMP drivetrain 42 may alternatively be configured as a direct-drive drivetrain, where the EMP geartrain 110 is omitted. With such an arrangement, the propulsor rotor 22 rotates at a common (the same) rotational speed as the propulsor EM rotor 102A.

The EEM drivetrain 44 is configured to selectively operatively couple the turbine engine 38 to the propulsor electric machine 98A. The EEM drivetrain 44 of FIG. 3, for example, includes a power coupler 112 and an engine-electric machine (EEM) geartrain 114.

Examples of the power coupler 112 include, but are not limited to, a clutch or an actuatable toothed (e.g., splined, geared, etc.) coupling. The power coupler 112 is operatively coupled to and arranged (e.g., axially and/or mechanically) between the low speed rotating structure 68B and the EEM geartrain 114. During the first mode, the power coupler 112 is configured to operatively (e.g., mechanically) couple the low speed rotating structure 68B to the EEM geartrain 114. For example, where the power coupler 112 includes the clutch, the clutch may close and engage. During the second mode, the power coupler 112 is configured to operatively (e.g., mechanically) decouple the low speed rotating structure 68B from the EEM geartrain 114. For example, where the power coupler 112 includes the clutch, the clutch may open and disengage.

Examples of the EEM geartrain 114 include, but are not limited to, a transmission, a speed change device and/or an epicyclic geartrain with a planetary gear system or a star gear system. The EEM geartrain 114 is operatively coupled to and arranged (e.g., axially and/or mechanically) between the power coupler 112 and the propulsor EM rotor 102A. With this arrangement, the propulsor EM rotor 102A may rotate at a different (e.g., slower) rotational speed than an output from the power coupler 112. Here, the propulsor EM rotor 102A and the power coupler output may rotate in a common (the same) direction about their axes or in opposite directions about their axes depending, for example, upon the specific configuration of the EEM geartrain 114. However, it is contemplated the EEM drivetrain 44 may alternatively be configured as a direct-drive drivetrain, where the EEM geartrain 114 is omitted. With such an arrangement, the propulsor EM rotor 102A rotates at a common (the same) rotational speed as the power coupler output.

Figure 4:
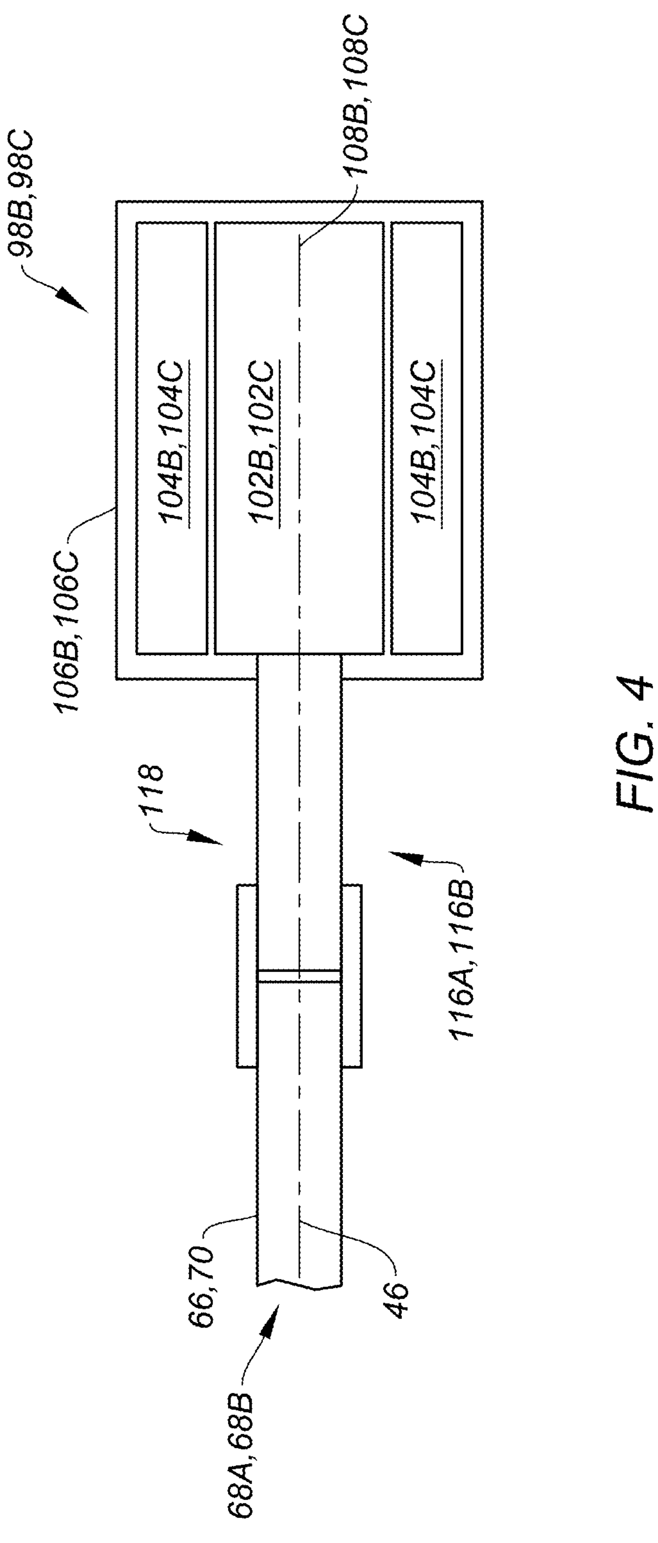
FIG. 4 is a side schematic illustration of the aircraft propulsion system at an engine electric machine with an inline coupling to an engine rotating structure.
Figure 5:
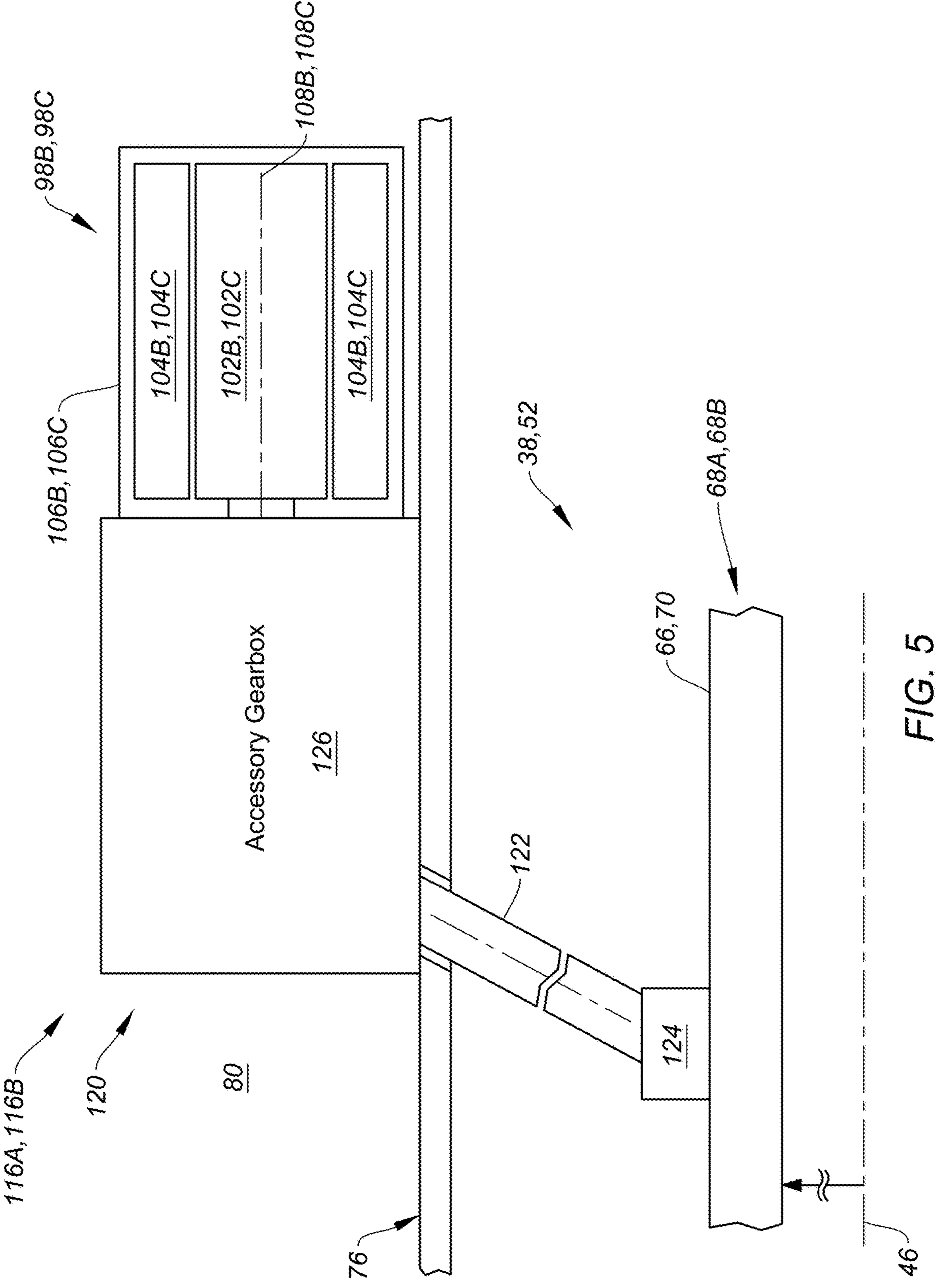
FIG. 5 is a side schematic illustration of the aircraft propulsion system at the engine electric machine with an offset coupling to the engine rotating structure.

Referring to FIG. 2, each engine electric machine 98B, 98C is operatively coupled to a respective one of the engine rotating structures 68A, 68B (generally referred to as "68") through a respective engine-electric machine (EEM) drivetrain 116A, 116B (generally referred to as "116"), schematically shown. This EEM drivetrain 116 may be configured as or otherwise include a shaft, a shaft assembly, a tower shaft assembly, one or more gearboxes (e.g., an accessory gearbox, an angle gearbox, etc.), and/or the like. For example, the EEM drivetrain 116 of FIG. 4 is configured as an inline coupling 118. This inline coupling 118 includes a shaft or a shaft assembly extending axially between and coupled to the respective engine rotating structure 68 and the respective engine electric machine (EM) rotor 102B, 102C. With this arrangement, the engine electric machine 98B, 98C of FIG. 4 and its engine EM rotor 102B, 102C are coaxial with the engine rotating structure 68. The engine electric machine 98B, 98C may also be housed within the inner housing structure 72 and its inner case 76 (see FIG. 1). Of course, it is contemplated the inline coupling 118 may also include a geartrain between the respective engine rotating structure 68 and the respective engine EM rotor 102B, 102C. In another example, the EEM drivetrain 116 of FIG. 5 is configured as an offset coupling 120. This offset coupling 120 includes a tower shaft 122, a gear system 124 and an accessory gearbox 126. The tower shaft 122 projects generally radially relative to the engine axis 46 between an inner end of the tower shaft 122 and an outer end of the tower shaft 122. The tower shaft 122 is operatively coupled to the respective engine rotating structure 68 at the shaft inner end through the gear system 124. The tower shaft 122 is operatively coupled to the respective engine electric machine 98B, 98C and its engine EM rotor 102B, 102C at the shaft outer end through the accessory gearbox 126. With this arrangement, the engine electric machine (EM) axis 108B, 108C of FIG. 5 is laterally and may be angularly offset from the engine axis 46. The engine electric machine 98B, 98C may also be housed within the inner housing compartment 80 radially outboard of the engine core 52 and its inner case 76. Of course, it is contemplated the engine electric machine 98B, 98C may alternatively be located outside of the inner housing structure 72; e.g., within the outer housing compartment 92 of FIG. 1.

Referring to FIG. 2, each electric machine 98 may be configurable as an electric motor and/or an electric generator; e.g., an electric motor-generator. For example, during a motor mode of operation, a respective electric machine 98 may operate as the electric motor to convert electricity received from the aircraft electrical system 96. The machine stator 104, for example, may generate an electromagnetic field with the machine rotor 102 using a current of electricity received from the aircraft electrical system 96 through the respective EM controller 100. This electromagnetic field may drive rotation of the machine rotor 102. The machine rotor 102, in turn, may provide mechanical power to and drive rotation of the respective rotating component 22, 68 through the respective drivetrain 42, 116. This mechanical power may be provided to boost power or completely power the rotation of the respective rotating component 22, 68. By contrast, during a generator mode of operation, the electric machine 98 may operate as the electric generator to convert mechanical power received from the respective engine rotating structure 68 into electricity. Rotation of the machine rotor 102, for example, may be rotationally driven by rotation of the respective engine rotating structure 68 through the respective EEM drivetrain 44, 116. The rotation of the machine rotor 102 may generate an electromagnetic field with the machine stator 104, and the machine stator 104 may convert energy from the electromagnetic field into electricity. The respective electric machine 98 may then provide a current of electricity to the aircraft electrical system 96 through the respective EM controller 100 for storage and/or further use. The electric machines 98 of the present disclosure, however, are not limited to such exemplary operation. For example, one, some or all of the electric machines 98 (e.g., the low speed engine electric machine 98C) may alternatively each be configured as a dedicated electric generator; e.g., without the electric motor functionality. One, some or all of the electric machines 98 (e.g., the propulsor electric machine 98A) may alternatively each be configured as a dedicated electric motor; e.g., without the electric generator functionality.

Each EM controller 100A-C includes a controller housing 128A-C (generally referred to as "128") and internal controller circuitry 130A-C (generally referred to as "130"). The controller housing 128 may be configured as an enclosed case (e.g., a closed or sealed container) for the respective controller circuitry 130. The controller circuitry 130 is disposed within an interior of the controller housing 128; e.g., an internal chamber or other volume(s) within and enclosed by the controller housing 128. The controller circuitry 130 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), a processing device, memory, a communication module, electrical transformer(s), electrical rectifier(s), and/or the like.

Each EM controller 100A-C is electrically coupled to a respective one of the electric machines 98 through one or more electric cables 132A-C (generally referred to as "132"); e.g., high voltage electric cables, power feeder cables, etc. More particularly, the controller circuitry 130 of each EM controller 100 is electrically coupled to the respective electric machine 98 and its machine stator 104 through the respective electric cables 132. Similarly, each EM controller 100A-C is electrically coupled to an electrical distribution bus 134 of the aircraft electrical system 96 through one or more electric cables 136A-C (generally referred to as "136"); e.g., high voltage electric cables, power feeder cables, etc. More particularly, the controller circuitry 130 of each EM controller 100 is electrically coupled to the aircraft electrical system 96 and its electrical distribution bus 134 through the respective electric cables 136.

Each EM controller 100 and its controller circuitry 130 are configured to control operation of a respective one of the electric machines 98. For example, when operating as the electric motor, the respective EM controller 100 and its controller circuitry 130 are configured to regulate a flow of electricity from the aircraft electrical system 96 to the respective electric machine 98. This electricity flow regulation may include: (a) turning-on the flow of electricity from the aircraft electrical system 96 to the respective electric machine 98 (e.g., electrically coupling the respective electric machine 98 to the aircraft electrical system 96); (b) turning-off the flow of electricity from the aircraft electrical system 96 to the respective electric machine 98 (e.g., electrically decoupling the respective electric machine 98 from the aircraft electrical system 96); (c) moderating the flow of electricity from the aircraft electrical system 96 to the respective electric machine 98. Here, the respective EM controller 100 operates as a motor controller. In another example, when operating as the electric generator, the respective EM controller 100 and its controller circuitry 130 are configured to regulate a flow of electricity from the respective electric machine 98 to the aircraft electrical system 96. This electricity flow regulation may include: (a) turning-on the flow of electricity from the respective electric machine 98 to the aircraft electrical system 96 (e.g., electrically coupling the respective electric machine 98 to the aircraft electrical system 96); (b) turning-off the flow of electricity from the respective electric machine 98 to the aircraft electrical system 96 (e.g., electrically decoupling the respective electric machine 98 from the aircraft electrical system 96); (c) moderating the flow of electricity from the respective electric machine 98 to the aircraft electrical system 96. Here, the respective EM controller 100 operates as a generator controller.

The EM controllers 100 may be disposed within the outer housing compartment 92. Each EM controller 100 of FIG. 1, for example, is located radially outboard of and next to the outer case 88, and each EM controller 100 is mounted to the outer case 88. This mounting of the respective EM controller 100 to the outer case 88 may be a direct mounting or an indirect mounting through an intermediate mounting structure. Of course, it is contemplated one or more of the EM controllers 100 may alternatively be located elsewhere within the aircraft propulsion system 20 or even outside of the aircraft propulsion system 20; e.g., in a pylon structure for the aircraft propulsion system 20.

Referring to FIG. 2, the aircraft electrical system 96 includes the electrical distribution bus 134. This aircraft electrical system 96 may also include a power source 138 and/or a power storage 140. The electrical distribution bus 134 is electrically coupled to each of the electric machines 98 through their respective EM controllers 100. The electrical distribution bus 134 is also electrically coupled to the power source 138 and the power storage 140, schematically shown through lines 142 and 144. Of course, the electrical distribution bus 134 may also be electrically coupled to one or more additional electric components of the aircraft propulsion system 20 (e.g., engine accessories, etc.) and/or one or more additional electric components of the aircraft outside of the aircraft propulsion system 20 (e.g., airframe mounted electric components, engine accessories and/or an electric machine system for a companion aircraft propulsion system, etc.). With this arrangement, the electrical distribution bus 134 provides an intermediate connection between the various electrical members 98A (via 100A), 98B (via 100B), 98C (via 100C), 138 and/or 140. The power source 138 may be an electric generator powered by the turbine engine 38 (see FIG. 1) or an electric generator powered by another aircraft powerplant; e.g., an engine of the companion aircraft propulsion system, an engine of an auxiliary power unit (APU), a fuel cell system, etc. The power storage 140 is configured to receive electricity from the electrical distribution bus 134 for storage. The power storage 140 is also configured to provide the stored electricity to the electrical distribution bus 134. The power storage 140, for example, may be configured as or otherwise include one or more electricity storage devices; e.g., batteries, super capacitors, etc. With the foregoing aircraft electrical system arrangement, when operating as an electric motor, the electrical current provided to the propulsor electric machine 98A may be received through the electrical distribution bus 134 from any one, some or all of: the power source 138; the power storage 140; the high speed engine electric machine 98B (if and when operating as an electric generator); and/or the low speed engine electric machine 98C (if and when operating as an electric generator). Similarly, if and when operating as an electric motor, the electrical current provided to the high speed engine electric machine 98B may be received through the electrical distribution bus 134 from any one, some or all of: the power source 138; the power storage 140; the propulsor electric machine 98A (if and when operating as an electric generator); and/or the low speed engine electric machine 98C (if and when operating as an electric generator). Still similarly, if and when operating as an electric motor, the electrical current provided to the low speed engine electric machine 98C may be received through the electrical distribution bus 134 from any one, some or all of: the power source 138; the power storage 140; the propulsor electric machine 98A (if and when operating as an electric generator); and/or the high speed engine electric machine 98B (if and when operating as an electric generator).

Referring to FIG. 1, during the first mode, the turbine engine 38 and the propulsor electric machine 98A may operate in hybrid-electric parallel to drive the rotation of the propulsor rotor 22. During this first mode, the power coupler 112 is configured to operatively couple the low speed rotating structure 68B to the propulsor EM rotor 102A through the EEM drivetrain 44. The low speed rotating structure 68B is thereby mechanically coupled to the propulsor rotor 22 sequentially through the EEM drivetrain 44 and its members 112 and 114, the propulsor electric machine 98A and its propulsor EM rotor 102A, and the EMP drivetrain 42 and its EMP geartrain 110. During this first mode, ambient air from the external environment 36 enters the aircraft propulsion system 20 through an airflow inlet 146. This air is propelled by the rotating propulsor rotor 22 in a downstream, aft direction towards the core inlet 56 and the bypass inlet 84.

An outer stream of the air propelled by the rotating propulsor rotor 22 is directed into the bypass flowpath 82 through its bypass inlet 84, which air entering the bypass flowpath 82 may be referred to as "bypass air". The guide vane structure 74 conditions (e.g., straightens out, de-swirls, etc.) the flow of the bypass air within the bypass flowpath 82. This conditioned bypass air is subsequently directed out of the aircraft propulsion system 20 through the bypass exhaust 86 to provide forward thrust. This propulsion of the bypass air may account for a majority of the forward thrust generated by the aircraft propulsion system 20 and its turbine engine 38 of FIG. 1.

An inner stream of the air propelled by the rotating propulsor rotor 22 is directed into the core flowpath 54 through its core inlet 56, which air entering the core flowpath 54 may be referred to as "core air". This core air is compressed by the LPC rotor 60 and the HPC rotor 61 and is directed into a combustion chamber 148 (e.g., annular combustion chamber) of a combustor 150 (e.g., annular combustor) in the combustor section 49. Fuel is injected into the combustion chamber 148 by one or more fuel injectors 152 and mixed with the compressed core air to provide a fuel-air mixture. This fuel-air mixture is ignited and combustion products thereof flow through and sequentially drive rotation of the HPT rotor 62 and the LPT rotor 63. The rotation of the HPT rotor 62 and the LPT rotor 63 respectively drive rotation of the HPC rotor 61 and the LPC rotor 60 and, thus, compression of the air received from the core inlet 56. The rotation of the LPT rotor 63 also drives rotation of the propulsor rotor 22 through the propulsion system members 44, 98A and 42. The turbine engine 38 thereby generates engine mechanical power for driving the rotation of the propulsor rotor 22. In addition, the propulsor electric machine 98A may also convert electrical power into electric machine mechanical power as described above to further drive the rotation of the propulsor rotor 22.

During the first mode, the electric machine mechanical power provided to the propulsor rotor 22 from the propulsor electric machine 98A may be equal to or greater than the engine mechanical power provided to the propulsor rotor 22 from the turbine engine 38. The engine mechanical power may thereby be used to boost the electric machine mechanical power provided to the propulsor rotor 22. The aircraft propulsion system 20 may be operated in the first mode during high thrust aircraft operation; e.g., aircraft takeoff, aircraft climb, aircraft landing with reverse thrust, and/or other relatively high thrust aircraft maneuvers. Of course, in other embodiments, it is contemplated the electric machine mechanical power may be less than the engine mechanical power. Moreover, during this first mode or one or more similar modes, it is contemplated the turbine engine 38 may be operated as described above to provide the engine mechanical power to the propulsor rotor 22, while the propulsor electric machine 98A may alternatively be operated as an electric generator to generate electrical power or still alternatively the propulsor electric machine 98A may be non-operational (e.g., turned-off, damaged, etc.). Here, although the propulsor EM rotor 102A is not driven by the operation of the propulsor electric machine 98A, the propulsor EM rotor 102A is still operable to provide a power coupling between the EEM drivetrain 44 and the EMP drivetrain 42.

During the second mode, the turbine engine 38 and the propulsor electric machine 98A may operate in hybrid-electric series to drive the rotation of the propulsor rotor 22. During this second mode, the power coupler 112 is configured to operatively decouple the low speed rotating structure 68B from the propulsor EM rotor 102A through the EEM drivetrain 44. The propulsor EM rotor 102A may thereby rotate independent of the low speed rotating structure 68B. During this second mode, the turbine engine 38 may operate as described above with respect to the first mode. However, rather than outputting the engine mechanical power to the propulsor rotor 22, the turbine engine 38 may be operated to power one or more of the engine electric machines 98B and 98C to generate electrical power to facilitate operation of the propulsor electric machine 98A. The propulsor electric machine 98A may use this electrical power, and/or electrical power received from the power source 138 and/or the power storage 140 (see FIG. 2), to (e.g., completely) drive the rotation of the propulsor rotor 22. The aircraft propulsion system 20 may be operated in the second mode during low thrust aircraft operation; e.g., aircraft cruise, aircraft taxiing, and/or other relatively low thrust aircraft maneuvers. Of course, in other embodiments, it is contemplated the turbine engine 38 may be non-operational where all electrical power provided to the propulsor electric machine 98A is received from another power source or sources; e.g., the power source 138 and/or the power storage 140 of FIG. 2.

In a third mode of operation, the turbine engine 38 may be operated as described above. However, the power coupler 112 is configured to operatively decouple the low speed rotating structure 68B from the propulsor EM rotor 102A through the EEM drivetrain 44. In addition, the propulsor electric machine 98A may be non-operational or operated as an electric generator. The aircraft propulsion system 20 may operate in this third mode when, for example, the aircraft is stationary on ground.

Figure 6:
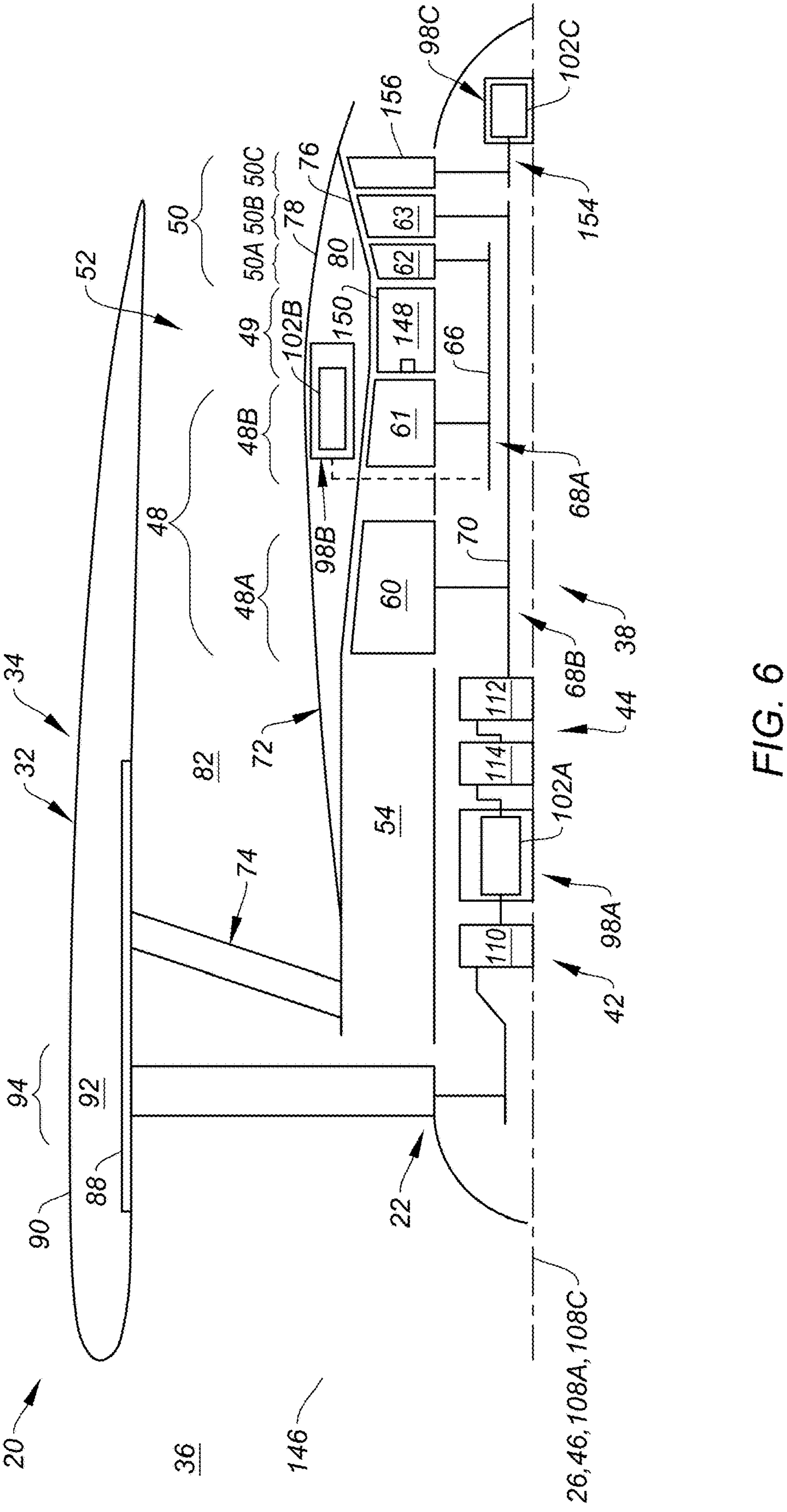
FIG. 6 is a side schematic illustration of the aircraft propulsion system with another turbine engine arrangement.

The turbine engine 38 of FIG. 1 is described above with a two-spool architecture. The present disclosure, however, is not limited to such an exemplary turbine engine architecture. For example, referring to FIG. 6, the turbine engine 38 may be configured with a power turbine (PT) rotating structure 154 with a bladed power turbine (PT) rotor 156. This PT rotating structure 154 may be rotatable about the engine axis 46, where the PT rotor 156 is disposed along the core flowpath 54 within a power turbine (PT) section 50C of the turbine section 50. The PT section 50C of FIG. 6 is disposed downstream of the engine core 52 and its turbine section 50B; here, an intermediate pressure turbine (IPT) section of the turbine engine 38. With the arrangement of FIG. 6, the engine electric machine 98C and its machine rotor 102C may be operatively coupled to and driven by rotation of the PT rotating structure 154, rather than the low speed rotating structure 68B. Here, the engine electric machine 98C may be configured as a dedicated electric generator. Of course, it is contemplated the low speed rotating structure 68B may also be configured with an electric machine as described above.

Figure 7:
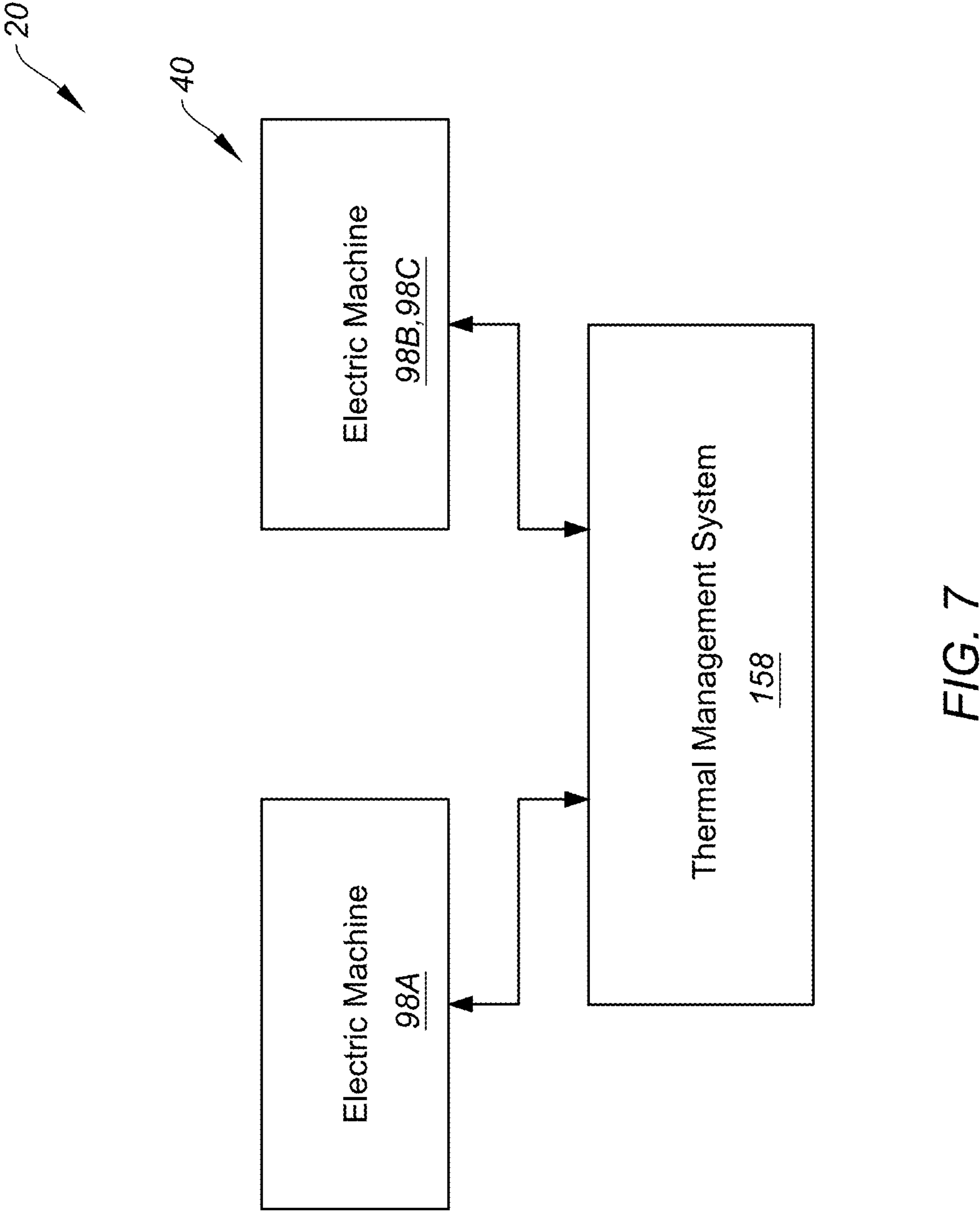
FIG. 7 is a schematic illustration of a thermal management system servicing multiple electric machines.

In some embodiments, referring to FIG. 7, one of the engine electric machines 98B, 98C (e.g., the engine electric machine 98C of FIGS. 1 and 6) may be configured as a dedicated electric generator for providing electrical power to the propulsor electric machine 98A. In such arrangements, the aircraft propulsion system 20 may be configured with a thermal management system (TMS) 158 such as a cooling system for the propulsor electric machine 98A and the respective engine electric machine 98C. This thermal management system 158 may be dedicated to cooling the electric machines 98A and 98C using one or more cooling fluids. Examples of these cooling fluids include, but are not limited to, fuel, lubricant, the bypass air, induction ambient air, a cryogenic liquid, refrigerant, and/or the like.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:

a propulsor rotor;

a powerplant configured to drive rotation of the propulsor rotor during a first mode and a second mode, the powerplant including a turbine engine, a first electric machine and a power coupler;

the turbine engine including a compressor section, a combustor section, a turbine section, a core flowpath and a first rotating structure, the core flowpath extending through the compressor section, the combustor section and the turbine section, and the first rotating structure comprising a first turbine rotor disposed along the core flowpath within the turbine section;

the first electric machine configured as an electric motor during at least the second mode, the first electric machine disposed between the propulsor rotor and the turbine engine, and the first electric machine comprising a first electric machine rotor coupled to the propulsor rotor;

the power coupler disposed between the first electric machine and the turbine engine, the power coupler configured to couple the first rotating structure to the first electric machine rotor during the first mode, and the power coupler configured to decouple the first rotating structure from the first electric machine rotor during the second mode; and a geartrain operatively coupled between the power coupler and the first electric machine rotor.

2. The system of claim 1, wherein during the first mode, the turbine engine is configured to generate engine mechanical power, and the powerplant is configured to transfer the engine mechanical power from the first rotating structure, through the power coupler and the first electric machine rotor, to the propulsor rotor to drive the rotation of the propulsor rotor; and during the second mode, the first electric machine is configured to generate electric machine mechanical power, and the powerplant is configured to transfer the electric machine mechanical power from the first electric machine rotor to the propulsor rotor to drive the rotation of the propulsor rotor.

3. The system of claim 2, wherein, during the first mode, the first electric machine is further configured to generate the electric machine mechanical power, and the powerplant is configured to transfer the electric machine mechanical power from the first electric machine rotor to the propulsor rotor to further drive the rotation of the propulsor rotor.

4. The system of claim 1, wherein the first electric machine is further configurable as an electric generator outside of the second mode.

5. The system of claim 1, wherein the powerplant further includes a second electric machine electrically coupled to the first electric machine;

the second electric machine is configured as an electric generator during at least the second mode; and the second electric machine comprises a second electric machine rotor operatively coupled to the first rotating structure.

6. The system of claim 5, wherein the second electric machine rotor is coaxial with the first rotating structure.

7. The system of claim 5, wherein a rotational axis of the second electric machine rotor is offset from a rotational axis of the first rotating structure.

8. The system of claim 1, wherein the turbine engine further includes a second rotating structure rotationally independent of the first rotating structure, and the second rotating structure comprises a second turbine rotor disposed along the core flowpath within the turbine section; and the powerplant further includes a second electric machine electrically coupled to the first electric machine, the second electric machine is configured as an electric generator during at least the second mode, and the second electric machine comprises a second electric machine rotor operatively coupled to the second rotating structure.

9. The system of claim 8, wherein the second electric machine rotor is coaxial with the second rotating structure.

10. The system of claim 8, wherein a rotational axis of the second electric machine rotor is offset from a rotational axis of the second rotating structure.

11. The system of claim 8, wherein the second rotating structure further comprising a compressor rotor disposed along the core flowpath within the compressor section.

12. The system of claim 8, wherein the second turbine rotor is configured as a power turbine rotor.

13. The system of claim 1, further comprising:

a propulsion system including the propulsor rotor and the powerplant; and a power source discrete from the propulsion system, the power source configured to supply electrical power to the first electric machine during the second mode.

14. The system of claim 1, further comprising a power storage configured to supply electrical power to the first electric machine during the second mode.

15. The system of claim 1, wherein the power coupler comprises a clutch.

16. The system of claim 1, further comprising a second geartrain operatively coupled between the first electric machine rotor and the propulsor rotor.

17. A system for an aircraft, comprising:

a propulsor rotor;

a powerplant including a turbine engine, a first electric machine and a power coupler;

the powerplant configured to drive rotation of the propulsor rotor using engine mechanical power generated by the turbine engine during a first mode where the engine mechanical power is transferred from the turbine engine, through the power coupler and the first electric machine, to the propulsor rotor;

the powerplant configured to drive the rotation of the propulsor rotor using electric machine mechanical power generated by the first electric machine during a second mode where the electric machine mechanical power is transferred from the first electric machine to the propulsor rotor;

the power coupler configured to operatively couple the turbine engine to the first electric machine during the first mode, and the power coupler configured to operatively decouple the turbine engine from the first electric machine during the second mode; and a geartrain operatively coupled between the power coupler and a rotor of the first electric machine.

18. The system of claim 17, wherein the powerplant is further configured to drive the rotation of the propulsor rotor using the electric machine mechanical power generated by the first electric machine during the first mode where the electric machine mechanical power is transferred from the first electric machine to the propulsor rotor independent of the turbine engine and the power coupler.

19. A system for an aircraft, comprising:

a propulsor rotor;

a powerplant including a turbine engine, a first electric machine and a clutch, the powerplant configured to drive rotation of the propulsor rotor using engine mechanical power generated by the turbine engine during a first mode, and the powerplant configured to drive the rotation of the propulsor rotor using electric machine mechanical power generated by the first electric machine during a second mode;

the turbine engine including a compressor section, a combustor section, a turbine section, a core flowpath and a first rotating structure, the core flowpath extending through the compressor section, the combustor section and the turbine section, and the first rotating structure comprising a first turbine rotor disposed along the core flowpath within the turbine section;

the first electric machine comprising a first electric machine rotor, and the first electric machine rotor mechanically coupled to the propulsor rotor;

the clutch configured to operatively couple the first rotating structure to the first electric machine rotor during the first mode, and the clutch configured to operatively decouple the first rotating structure from the first electric machine rotor during the second mode; and a geartrain operatively coupled between the clutch and the first electric machine rotor.

* * * * *